No. 773,848. PATENTED NOV. 1, 1904.
B. A. BROOKS.
TYPE WRITING MACHINE.
APPLICATION FILED MAY 21, 1902.
NO MODEL. 6 SHEETS—SHEET 1.

Fig.1.

WITNESSES:
K. V. Donovan,
Charles O. Smith

INVENTOR
Byron A. Brooks
by Jacob Felbel
HIS ATTORNEY

No. 773,848. PATENTED NOV. 1, 1904.
B. A. BROOKS.
TYPE WRITING MACHINE.
APPLICATION FILED MAY 21, 1902.
NO MODEL. 6 SHEETS—SHEET 3.

WITNESSES:
K. V. Donovan.
Charles E. Smith

INVENTOR
Byron A. Brooks
by Jacob Felbel
HIS ATTORNEY

Fig. 4.

No. 773,848. Patented November 1, 1904.

UNITED STATES PATENT OFFICE.

BYRON A. BROOKS, OF BROOKLYN, NEW YORK, ASSIGNOR TO UNION TYPEWRITER COMPANY, OF JERSEY CITY, NEW JERSEY, A CORPORATION OF NEW JERSEY.

TYPE-WRITING MACHINE.

SPECIFICATION forming part of Letters Patent No. 773,848, dated November 1, 1904.

Application filed May 21, 1902. Serial No. 108,360. (No model.)

*To all whom it may concern:*

Be it known that I, BYRON A. BROOKS, a citizen of the United States, and a resident of the borough of Brooklyn, city of New York, in the county of Kings and State of New York, have invented certain new and useful Improvements in Type-Writing Machines, of which the following is a specification.

My invention relates to type-writing machines, and more particularly to tabulating, automatic line-spacing, line-lock, pressure-roller release, carriage-return, and scale and pointer mechanisms.

The object of my invention is to provide efficient mechanisms of the characters pointed out and to render the machine as a whole more efficient.

A further object of my invention is to provide a machine wherein one of said mechanisms may contribute to, be utilized for, or facilitate the actuation of another or other of such mechanisms.

To these and other ends, which will hereinafter appear, my invention consists in the novel construction, arrangement, and combination of parts to be hereinfter described, and more particularly pointed out in the appended claims.

In the accompanying drawings, wherein various parts have been omitted or broken away to better illustrate other parts of the structure, and wherein like reference characters represent corresponding parts in the various views.

While I have illustrated the various features of my present invention applied to a three-quarter or diagonal-strike "visible" type-writing machine, it should be understood that the invention or any one or more of the separate features thereof may be applied to other characters of type-writing machines.

Figure 2:
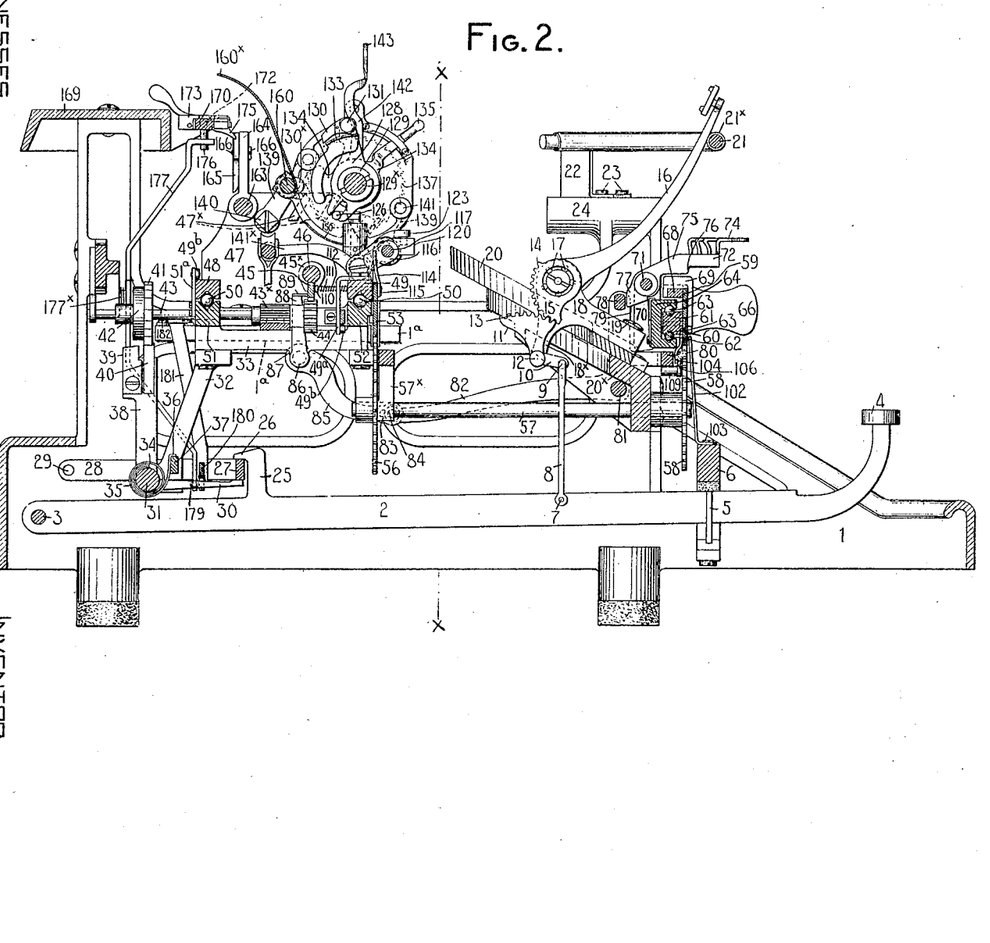
Fig. 2 is a vertical front to rear sectional view of the same.
Figure 4:
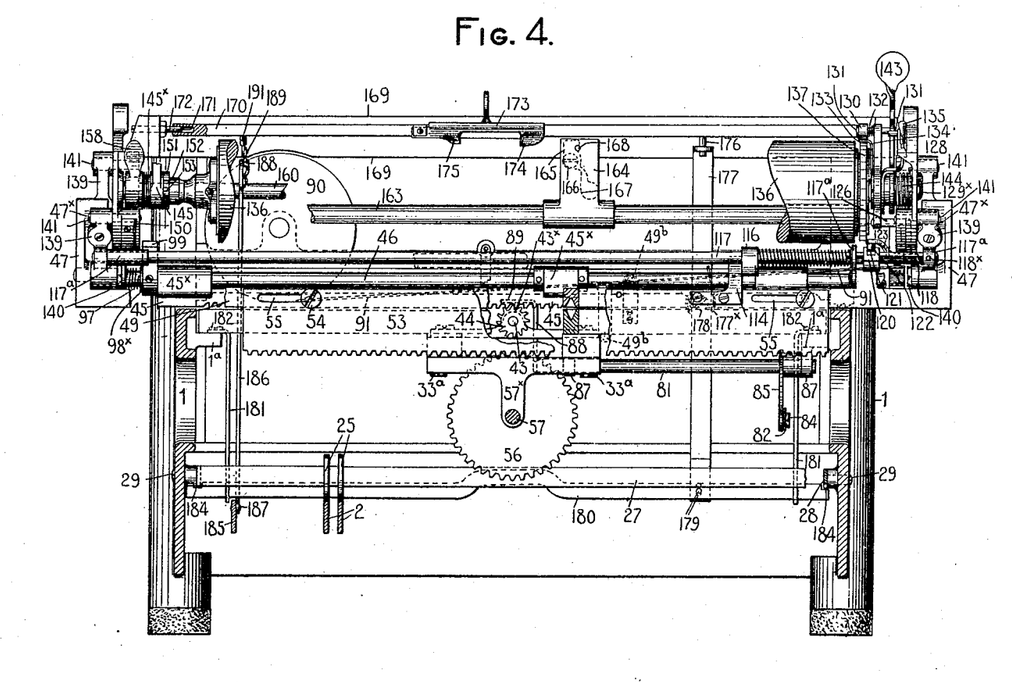
Fig. 4 is a vertical transverse sectional view of the machine on the line *x x* of Fig. 2 and looking toward the rear of the machine.

The frame 1 of the machine has key-levers 2, pivoted at 3 therein, and each key-lever is provided with a finger-key 4 at its forward end, the key-levers being guided in their movement by a comb 5 near the forward ends thereof, which comb is secured to a cross-bar 6, attached to the frame. Each key-lever has pivoted thereto at 7 an upwardly-extending link 8, the upper end of each link being pivoted at 9 to an arm 10, that projects from a segmental actuating part 11, that is pivoted at 12 and is provided with gear-teeth 13 on the segmental edge thereof. These teeth 13 mesh with teeth 14 on a segmental portion 15, connected to or forming the heel of a type-bar 16, that may be provided with an internal raceway for coöperation with antifriction-balls 17, interposed between the raceway of each type-bar and a support extending from the type-bar hanger 18, and a depending portion $18^\times$ of each hanger constitutes a support to which the associated part 11 is pivoted. The various type-bar hangers may be secured by screws 19 to an inclined segment 20, the latter in turn being secured to inclined brackets or supports 20×. The type-bars normally rest near their free ends upon the elastic sheath 21× of a curved support 21, that is connected to brackets 22, which are secured by screws 23 to extensions or corner-posts 24 of the frame 1. Each of the key-levers 2 is provided with an upwardly-extending arm 25, that is provided with a hook-like portion 26, adapted to bear upon the top of a universal bar 27, that extends transversely across the machine above the key-levers and is provided at its ends with rearwardly-extending arms 28, which are pivoted at 29 to the sides of the frame of the machine. The universal bar 27 bears at its under side on a forwardly-extending crank-arm 30, projecting from a rock-shaft 31, that is mounted to turn in bracket-arms 32, depending from a frame-like portion 33. This rock-shaft is connected at 34 to one end of a spring 35, the opposite end of which bears at 36 on a fixed bar 37 and tends to restore the rock-shaft to its normal position. Extending upwardly from the rock-shaft 31 is a dog-rocker 38, which carries the usual or any suitable character of feed-dogs 39 and 40, that coöperate with an escapement-wheel 41. The escapement-wheel is operatively connected by the usual pawl-and-ratchet mechanism (not shown) contained within the housing 42 to a shaft 43, that extends forwardly and is supported in suitable bearings 43×, and the forward end of the shaft has a feed-pinion 44 secured thereto. A feed-rack 45 is pivoted by ears 45× to swing on a bar 46, fixed to the carriage, and meshes with the feed-pinion 44 and affords a letter-space movement of the carriage when the escapement mechanism is actuated by an operation of a finger-key. The carriage comprises end plates 47, that are united by rails or cross-bars 48 49, that are grooved on their lower faces to form raceways for the reception of antifriction-balls 50. Bearing-rails 51 52 extend transversely across the machine and are supported upon lugs 1ª, that project inwardly from the machine-frame, (see Fig. 4,) and the bearing-rails 51 and 52 support the frame 33 by connecting-screws 33ª. These rails are grooved on their upper faces to form raceways for the reception of the antifriction-balls 50, and thus provide a support for the carriage, suitable pins or stops being provided to limit the movement of the carriage and prevent an escape of the antifriction-balls from their raceways. Arms 49ª and 51ª, Fig. 2, are carried, respectively, on the rails 49 and 51 and have rollers 49ᵇ pivoted thereto and which bear upon the rails 48 and 52 and prevent the carriage from being removed from its supporting-rails.

Figure 1:
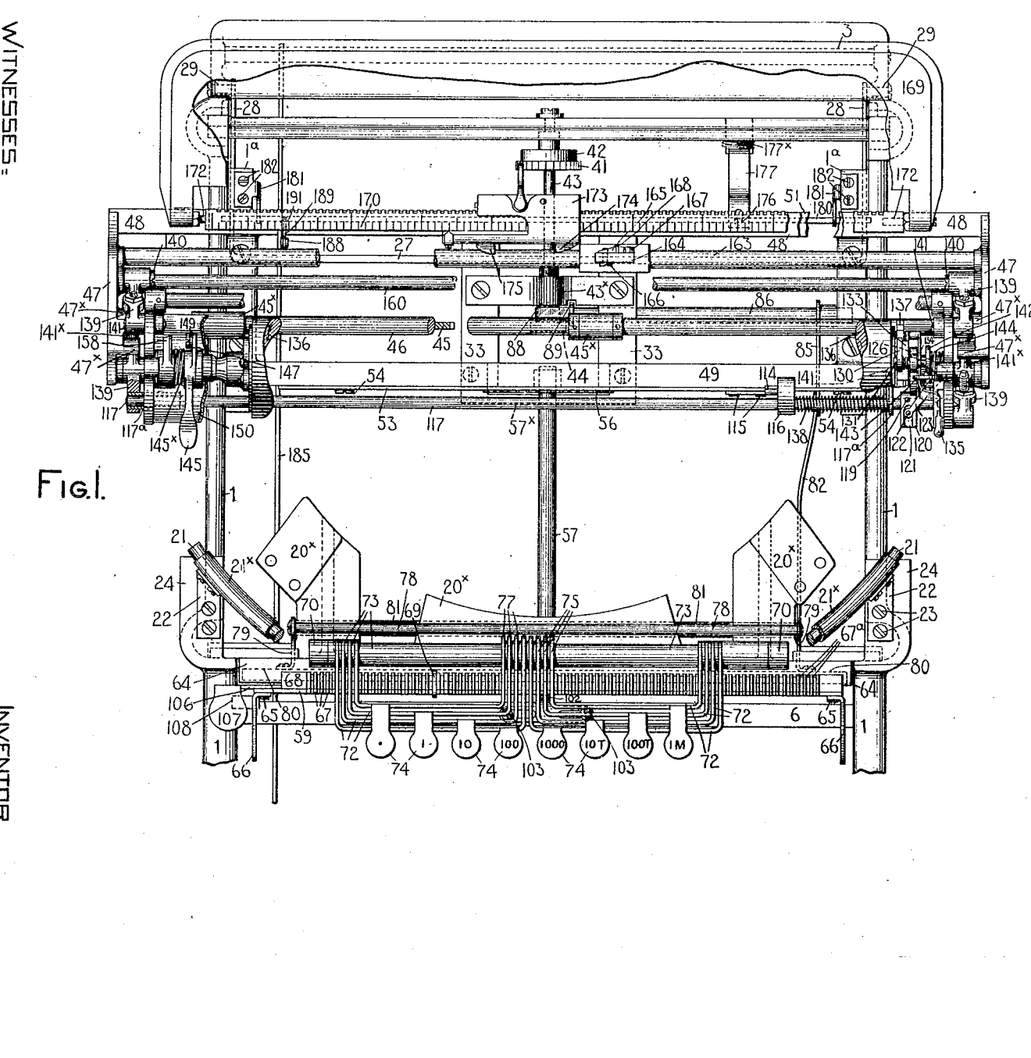
Figure 1 is a plan view of the machine with parts broken away.
Figure 5:
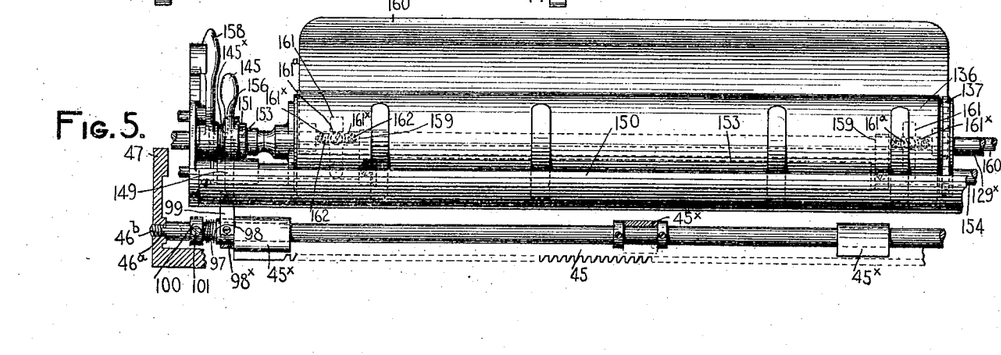
Fig. 5 is a fragmentary detail front elevation of the paper-carriage with parts in section.
Figures 8, 9:
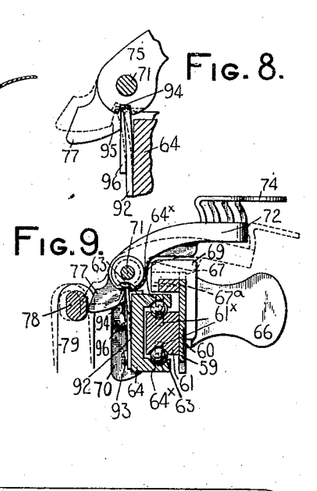
Fig. 8 is an enlarged detail fragmentary side view of one of the tripping-fingers of the denomination or tabular keys.
Fig. 9 is a detail end view of a portion of the tabulating mechanism.

The cross bar or rail 49 of the carriage has a depending rack 53 connected thereto by screws 54, the stems of which pass through slots 55 in the rack and into threaded openings in the rail to permit a relative longitudinal movement of the rack under certain conditions which will hereinafter be explained. This rack 53 meshes with a gear 56 that is secured to a shaft 57, extending fore and aft and centrally of the machine and is supported in bearings in the central bracket 20× and in a bracket 57×, secured to the lower side of the frame 33 by the screws 33×, which unite the frame to the cross-supporting rails. The forward end of the shaft 57 (see Fig. 2) has a gear-wheel 58 secured thereto, the gears 56 and 58 being of the same size. The gear 58 meshes with a rack 59, (see Figs. 2 and 3,) that carries a scale 60 on the front face thereof, which scale corresponds to the letter-spacing of the paper-carriage in its movement from one end to the other of the machine. The rear face of the rack 59 has secured thereto a rail 61, which extends throughout the length of the rack and is provided on its upper and lower faces with pins 61× near the ends thereof (see Figs. 9 and 10) to limit its movement and with raceways 62 for coöperation with antifriction-balls 63. This rail is adapted to be received in a channel-iron 64, that is secured to the frame of the machine and is provided with oppositely-disposed raceways for coöperation with the antifriction-balls 63, thus forming a support for the rack 59 and the parts connected thereto, so that these parts are in the nature of an auxiliary carriage which travels with the paper-carriage. Pins 64× (see Fig. 9) are situated in the ends of the raceways in the channel-iron and coöperate with the pins 61× to limit the movement of the auxiliary carriage and prevent the balls 63 from escaping from their raceways. From an examination of Fig. 1 it will be observed that the rack 59 has secured thereto near each end by screws 65 a finger-piece 66, by means of which the auxiliary carriage may be moved from left to right, at the same time moving the paper-carriage in the same direction and to a like extent through the intermediate gear-and-rack connection. The upper edge of the rack-bar 59 is provided with teeth 67, and an additional bar 68 is secured to the rear side thereof. This additional bar 68 is likewise provided with teeth, which register with and constitute parts of the teeth 67, whereas the rear face of the bar is provided with vertically-disposed teeth 67ª, and the teeth 67 and 67ª are adapted to receive the inverted-U-shaped column-stops 69 between them, thus affording means for adjustably retaining the column-stops on the rack-bar 59. Extending upwardly from the channel-iron 64 and to the rear side thereof are brackets 70, the upper ends of which are apertured to receive and constitute bearings for a shaft 71. This shaft has mounted to vibrate thereon a series of nested U-shaped denominational key-levers 72, (see Fig. 1,) the key-levers being arranged in two series, one series to each side of the center of the machine. Suitable spacing sleeves and washers 73 are interposed between the arms of these levers to maintain them spaced apart and prevent them from moving longitudinally on the shaft 71. Each U-shaped lever has formed integral therewith a finger-key 74, which projects upwardly and then forwardly therefrom, as shown in Fig. 2. The arrangement of these finger-keys is such that any U-shaped key-lever may be depressed without depressing the remaining levers of the nested series. The rearwardly-extending centrally-located arms 75 of the denominational key-levers are situated at letter-space distances apart and are each provided with a projection 76, (see Fig. 2,) that extends downwardly therefrom and constitutes a denominational stop that coöperates with the column stop or stops carried by the so-called "auxiliary" carriage when the corresponding denominational keys are depressed. The centrally-located rearwardly-extending arms 75 of the denominational key-levers each extends to the rear of the shaft 71, where it forms a finger 77, that coöperates with what may be termed a "universal" bar 78 for the tabulating mechanism. This bar 78 is connected at its ends to a frame (see Fig. 12) that is made up of end plates 79, which are united by a cross-bar 80 as well as by the bar 78. The frame is secured to a rod or rock-shaft 81, which is supported and turns in bearings in the fixed supports 20×, which are situated intermediate of the ends of said rod 81. One of the end plates 79 is provided with a rearwardly-directed arm 82, that is slotted near its rear end at 83 for the reception of a pin 84, projecting laterally from an arm 85, that is connected to a rock-shaft 86, which is adapted to turn in bearings 87, carried by a fixed support 33 and one of the lugs 1ª. (See Fig. 4.) One end of this rock-shaft carries a crank-arm 88, that extends upwardly and is provided with an angular forwardly-directed terminal portion 89, which from an examination of Figs. 2 and 12 it will be seen bears upon the rear face of the feed-rack 45, intermediate of the teeth at the pivotal center thereof. From the foregoing description it will be understood that the so-called "auxiliary" carriage is adapted under normal conditions to move with the paper-carriage or main carriage in the movement of the latter from end to end of the machine, so that the tension of the spring-drum 90, (see Fig. 4,) which is connected by a band 91 with the paper-carriage, is exerted during the feed movement thereof to propel the auxiliary carriage in the same direction through the intermediate racks and gears 53, 56, 58, and 59. It will also be understood that each of the denominational keys 74 has a corresponding stop 76 thereon and that these stops are situated at letter-space distances apart transversely and centrally of the machine and that the stop for the key shown provided with a decimal-point is that which is the farthest toward the left, (see Fig. 1,) whereas the denominational key marked "1M" for millions carries the denominational stop which is located farthest toward the right-hand side of the machine. A depression of any of the tabulating or denominational keys 74 will cause the stop carried thereby to be projected into the path of a column-stop 69 on the auxiliary carriage. The same movement of the denominational key will cause the so-called "universal" bar 78 to be moved toward the rear through the finger 77, connected to the denominational key-lever. This rearward movement of the bar 78 around its rock-shaft 81 as a center will cause the rear end of the arm 82 to be depressed, thus moving the forward end of the arm 85 down and vibrating the arm 88 forwardly, which movement is effective to turn the feed-rack 45 on its rod 46, moving the lower edge thereof forwardly to disengage it from the feed-pinion. The carriage thus being freed from its escapement mechanism may be propelled by its spring-drum 90 from right to left until the tabulating-stop 69 reaches the stop 76 on the depressed denominational key-lever, when the auxiliary carriage and the main carriage as well will be arrested at the proper denominational position. When pressure on the depressed denominational key is released, it will be restored to its normal position by a leaf-spring 92, (see Fig. 9,) which is secured at one end by a screw 93 to the channel-iron 64. The upper or free end of the leaf-spring projects into a recess 94, that is formed in the hub-like portion of that arm of each U-shaped denominational key-lever which is not provided with a rearwardly-extending finger 77—that is to say, the outermost arm of each lever. The movement of the key-lever back to the normal position is limited by a shoulder 95, which is formed by the forward portion of the finger 77, and is adapted to bear against an abutment 96, secured to the channel-iron 64. When pressure is released upon the denominational key-lever, the projecting finger 77 is carried to the full-line position shown in Figs. 8 and 9, and the weight of the bar 80 will restore the arms 82, 85, and 88 and the parts connected thereto to the normal positions, and the feed-rack 45 will be restored to its normal position in engagement with the feed-pinion 44 by a spring 97, Fig. 5, which is connected at one end, 98, to a hand-actuated arm 99, that is rigidly secured by a set-screw to a laterally-projecting sleeve 98×, that extends from one of the ears 45×, which pivotally connect the rack to the relatively fixed bar 46. The bar 46 is fixed against rotation by an angular stud 46ª, which is seated within a corresponding opening in the end of a screw 46ᵇ, that takes in a threaded opening in an end plate 47 of the carriage. The opposite end of the spring 97 is secured to an adjustable sleeve 100, that is carried by the rod 46 and is secured thereto by a set-screw 101.

Figure 3:
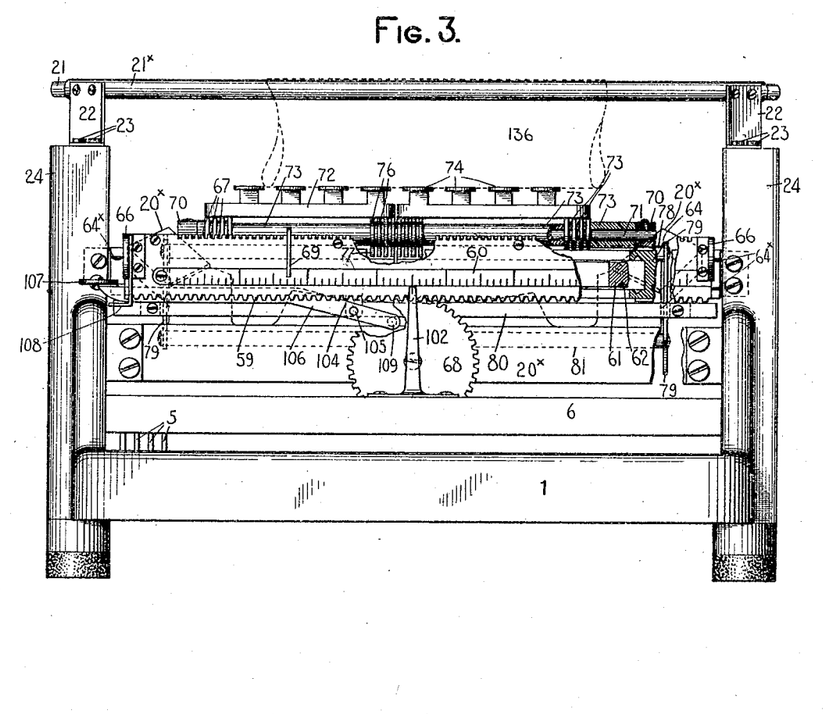
Fig. 3 is a front view of the machine with the paper-carriage omitted and broken away.

The fixed bar 6, secured to the frame, has a pointer 102 secured thereto by a screw 103, and this pointer projects upwardly from the bar and coöperates with the scale 60 on the auxiliary carriage, as indicated in Fig. 3, and constitutes, with said scale, means for indicating the position of the paper-carriage relatively to the printing-center.

A depending bracket-arm 104 is secured to the rail 61. (See Figs. 2 and 3.) This bracket has pivoted thereto at 105 a carriage-release lever 106, that has a general horizontal disposition and is provided at its left-hand end with a finger-piece 107, by means of which it may be depressed, the depression of the lever being limited by a bracket 108, that is secured to and projects down from the left-hand finger-piece 66 on the auxiliary carriage. The inwardly-projecting end of the lever 106 is provided with a rearwardly-extending pin 109, which projects under a cross bar or rail 80 at all times during the movement of the auxiliary carriage from end to end of the machine. The depression of the finger-piece 107 is effective to raise the opposite end of the lever 106, thus elevating the cross-bar 80, which results in depressing the arms 82 and 85, thereby rocking the upper end of the arm 88 forwardly and effecting a disengagement of the feed-rack from its pinion 44. It will thus be seen that hand-operated carriage-releasing means are provided on the auxiliary carriage, by means of which the carriages can be released at will, and that at the same time the same hand of the operator which affects the release may control the movement of the paper-carriage through the finger-piece 66 on the auxiliary carriage. In other words, one finger can be employed to depress the finger-piece 107 to release the paper-carriage, and a finger on the same hand may grasp the left-hand finger-piece 66 of the auxiliary carriage, thus controlling its movement, and consequently the movement of the paper-carriage.

Upon reference to Fig. 2 it will be seen that a rounded head 110 of the pin 111 is normally pressed against the forward face of the feed-rack by an expansion-spring 112, which bears at one end against the head and at its opposite end against the rail 49. This pin 111 is seated and moves endwise in an aperture in the rail 49, through which it extends, and when the lower edge of the rack 45 swings forward it will force the pin against the tension of its spring, and the forward end of the pin will be projected through an opening 113 (see Fig. 11) in the rack 53, thus locking the rack against longitudinal movement with relation to the rail 49, so that during the disposition of the parts above described, which is the one they normally assume, the paper-carriage and rack 53 move in unison in order that when a tabulating-key is depressed and the feed-rack is released the paper and auxiliary carriages will travel together, and when the latter is arrested by a denominational stop the paper-carriage will be arrested in a corresponding position and no independent movement of the two carriages can take place. When the tabulating-key is released, however, the feed-rack is permitted to swing down to the normal position and the locking-pin 111 is automatically withdrawn from the aperture in the rack 53.

Figures 10, 11, 12, 13:
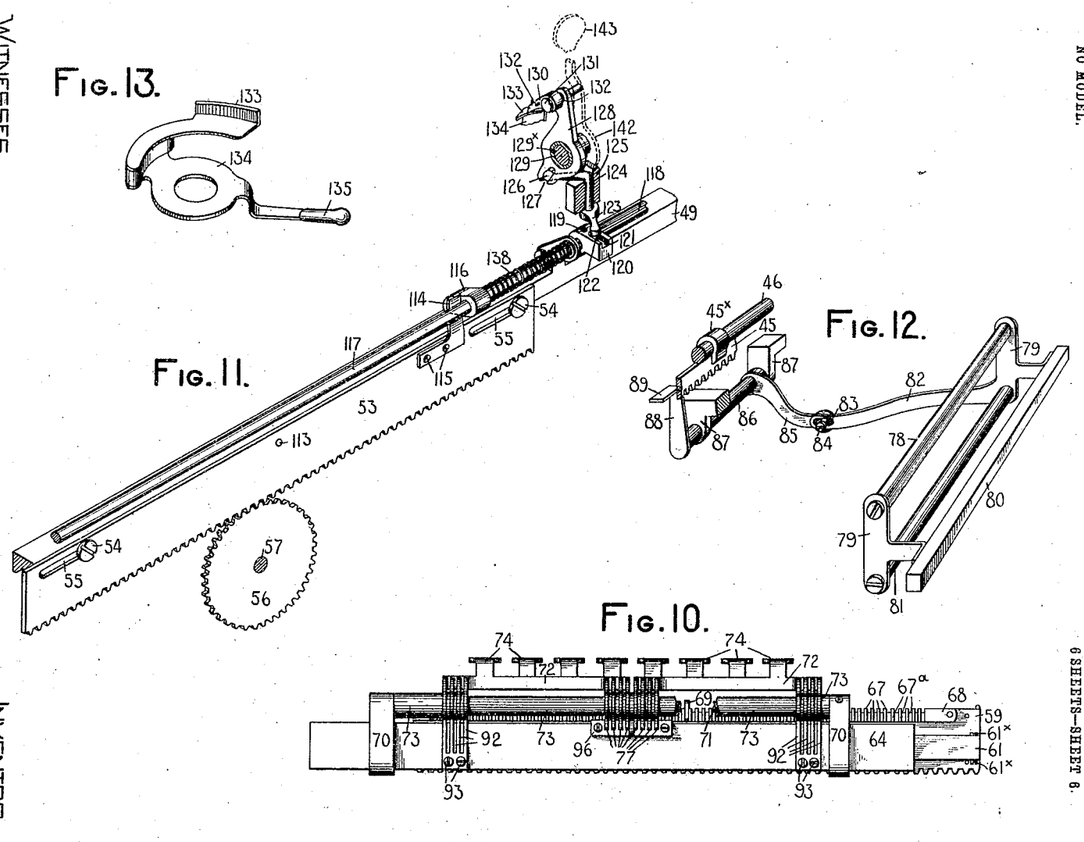
Fig. 10 is a detail rear elevation of a portion of the tabulating mechanism.
Fig. 11 is a detail perspective view of the automatic line-space mechanism, together with some of the parts which coöperate therewith.
Fig. 12 is a detail perspective view of portions of the tabulating mechanism.
Fig. 13 is a detail perspective view of a portion of the line-space-regulating device.

Extending upwardly from the rack 53 (see Figs. 2 and 11) is an arm 114, which is secured at 115 to the front face of the rack and is adapted to project into the path of a laterally-extending arm 116, that is secured to a rod 117, which is carried by the carriage and moves longitudinally with relation thereto. The right-hand end portion of the rod 117, Fig. 11, is grooved longitudinally at 118 and receives a projection or pin $118^\times$, Fig. 4, that extends through a relatively fixed portion of the platen-frame that constitutes one of the supports $117^a$ for said rod, and so prevents the rod 117 from turning. Adjustably secured to the rod by a set-screw 119, Fig. 11, is a laterally-projecting piece 120, which is grooved at 121 for the reception of a crank-pin 122, that extends downwardly from a crank-arm 123, connected to a rock-shaft 124, seated and adapted to turn in a portion 125 of the platen-frame. The bent arm 126, connected to this rock-shaft, is seated in a slot 127 of a vibratory piece or line-spacing pawl-carrier 128, that is pivoted on a sleeve 129, which surrounds the platen-shaft $129^\times$ near one end thereof. The upper end of this part 128 has a line-spacing pawl 130 pivoted thereto on a pin 131, that extends to the right of the carrier 128 for purposes which will hereinafter appear, and the pawl is maintained under tension of a spring 132. The nose of this pawl 130 when in the normal position is maintained by its spring against a shield 133, that is carried by a line-space-regulating device 134, provided with a finger-piece or handle 135, by which it may be moved around the sleeve 129, which surrounds the shaft $129^\times$ of the platen 136. The adjustment of the device 132 permits the pawl 130 to slip off the shield 133 and engage the teeth of the line-spacing ratchet-wheel 137 sooner or later during the throw of the pawl, and thus determines the extent of line-spacing movement of the platen.

From the foregoing description it will be understood that when the locking-pin 111 is normally released from the rack 53 and the auxiliary carriage is moved by a finger-piece 66 from left to right it will cause the paper-carriage to move in a like direction until arrested by its right-hand or margin stop, (the teeth of the rack-feed at this time being moved over the loose-feed dog.) When the paper-carriage has been arrested in the manner stated, the auxiliary carriage may receive a slight further independent movement toward the right by reason of the pin-and-slot connection 54 55 between the rack 53 and the carriage-rail 49, which independent movement results in the rack 53 being carried to the right independently of the paper-carriage, and the abutment 114 on the rack 53 will contact with the finger or projection 116, causing a longitudinal movement of the rod 117 toward the right. This movement is effective to rock the shaft 124, thus vibrating the carrier 128 and effecting an automatic line-space movement of the platen through the pawl 130 and the coöperating ratchet-wheel 137, the rearward vibration of the pawl being limited by a relatively fixed stud 130×. This movement of the auxiliary carriage carries the left-hand end of the scale 60 past the pointer 102; but as soon as the operator releases the finger-piece 66 the spring 138 will be effective to restore the rod 117, the rack 53, auxiliary carriage, and intermediate gears to their normal positions relatively to the paper-carriage, and the proper point on the scale 60 will be brought into register with its pointer 102.

It will be understood that under certain conditions it may not be necessary to move the carriages to the extreme right in order to effect an automatic line-spacing movement of the platen. Thus if the tension of the paper-carriage spring and the spring 138 be so proportioned that the tension of the spring 138 is less than that of the carriage-spring the automatic line-spacing movement can be effected at the initial part of the backward movement of the carriages. Then, again, a quick sharp return movement applied to the auxiliary carriage will effect the automatic line-spacing before the carriages are moved to the extreme right. It will likewise be observed that the spring 138, interposed, as it is, between the paper-carriage and the rack 53, will take up the shock due to the rapid movement of the carriage from left to right whenever the carriage is moved to the right through the auxiliary carriage.

The platen 136 through its platen-frame is mounted upon links 139, which are pivoted at 140 to the carriage and at 141 to the platen-frame. The lower set of these links carry or in part constitute the supports 117ª, in which the bar 117 moves longitudinally and the disposition and connection of the links 139 with the carriage and platen-frame is such that the platen-frame will be moved in an inclined plane when the crank-arm 141×, Fig. 2, is depressed by suitable means (not shown) to shift the platen transversely for upper and lower case printing, and the platen-frame is limited in this movement by fixed studs 47×, that project inwardly from the end plates 47 of the carriage (see Figs. 1 and 2) and against which suitable abutments on the links are adapted to bear.

In addition to the means above described for automatically effecting the line-space movement to the platen the machine is provided with a hand-operated line-spacing device at the right hand of the paper-carriage, so that the spacing movement of the platen may be effected at any time and is not dependent upon the movement of the carriage toward the right by the auxiliary carriage. This hand-operated line-spacing device consists of a vibratory piece 142, which is provided with an upwardly-extended finger-piece 143, by which it may be moved around the platen-sleeve 129, on which it is mounted, the piece being restored to the normal position by a spring 144, Fig. 4. The piece 142 stands in front and is adapted to vibrate in the path of the extensions on the pin 131, Fig. 11, of the pawl-carrier. The effect, therefore, of moving the finger-piece 143 toward the rear of the machine is to vibrate the line-spacing-pawl carrier 128 to be moved toward the rear of the machine, thus effecting a line-spacing movement of the platen. During this movement of the rock-shaft by means of the finger-piece 143 the rod 117 will be moved toward the right by reason of the intermediate connections between the carrier and said rod. This movement, however, will be an idle one and will in no way affect the rack 53.

Figure 6:
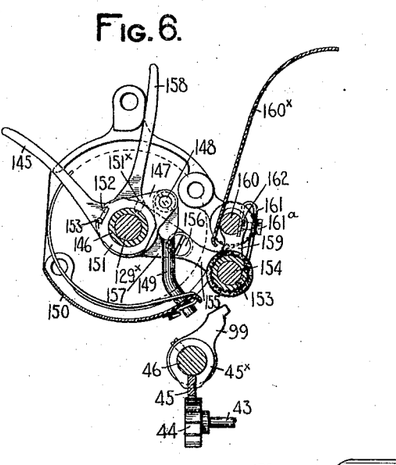
Fig. 6 is an enlarged detail inner end view, partly in section, of a portion of the platen-frame with certain of the coöperating parts, the view looking from right to left.
Figure 7:
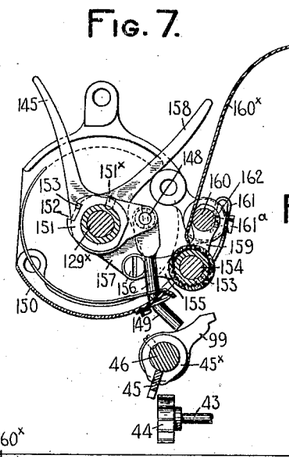
Fig. 7 is a like view of the same, showing the feed-rack in a disengaged position.

In addition to the paper-carriage-release key that is carried by the auxiliary carriage I have provided a hand-operated release device on the left-hand end of the paper-carriage and which consists of the finger-piece 145, Figs. 6 and 7, that is mounted to turn on a sleeve 146, seated loosely on the platen-shaft 129×, but fixed to the platen-frame. The finger-piece has a rearwardly-extending portion 147 connected thereto and to which is pivoted at 148 a plunger or rod 149, that is guided in an aperture in the paper-apron 150 and is adapted to bear at its lower end against the arm 99, which, as hereinbefore described, is secured to one of the ears which connect the feed-rack 45 to the rod 46 and projects upwardly therefrom. (See Fig. 5.) A spacing-washer 151 is secured to the sleeve 146 by a set-screw 151× and is recessed at 152 for the reception of a pin 153, carried by the part 145, and which limits the movement of the finger-piece and the parts connected thereto. When the finger-piece is moved from the position shown in Fig. 6 to that indicated in Fig. 7, a plunger 149 will be forced down against the arm 99, thus swinging the feed-rack out of engagement with the feed-pinion 44, and the carriage may be moved in either direction. The finger-piece is restored to the normal position by a spring 145×. (See Fig. 5.)

Coöperating with the platen are paper-feed rollers 153, Figs. 6 and 7, that are mounted upon a shaft 154, which extends throughout the length of the platen and beyond the ends thereof. This shaft 154 is connected at its ends to links or toggle-levers 155, which are pivoted at 156 to an arm 157, that is connected to a finger-piece 158 and is mounted to turn on the sleeve 146. The shaft 154 is likewise connected to links 159, that are pivoted to the relatively fixed rod 160, that is carried by the platen-frame and constitutes a support and pivot for the links of feed-rollers 153 and the paper-table 160$^\times$ as well. Bowed springs 161 are each connected to the rod 160 by screws 162, the stems of which pass through openings in ears 161$^\times$ of the spring, as indicated in dotted lines in Fig. 5, and take in threaded openings in the rod 160. The stem of a screw 161$^a$ passes through an opening in each spring 161 and is received within a threaded opening in the rod 160, whereas the head thereof bears against the outer or rear portion of the spring, thereby constituting means for adjusting the tension of the spring. The lower or free ends of the springs 161 bear against the shaft 154 and tend to maintain the feed-rollers in contact with the platen, as indicated in Fig. 7. The construction and arrangement of the toggle levers or links 157 and 155 is such that they will be brought into alinement or to a dead-centered position when the arm 158 is moved to the position shown in Fig. 6, thereby forcing the shaft 154, with its feed-rollers, away from the platen to the position indicated in said figure, the movement of the shaft being around the rod 160 as the pivotal center. When, however, the finger-piece 158 is moved forward, the toggle links or levers 155 and 157 will be moved from the dead-center position (shown in Fig. 6) to the position indicated in Fig. 7, and the tension of the spring 161 will be effective to press the rollers 153 against the platen. It will be understood that no means other than these shown and described are necessary to maintain the feed-rollers out of contact with the platen when the parts have been moved to the position indicated in Fig. 6, the pressure of the springs 161 at this time being exerted against the dead-center of the toggle-levers.

The paper-carriage is provided with a cross-bar 163, (see Figs. 2 and 4,) from which extends an upright bracket-arm 164, that has a gravity stop or trip 165 pivoted thereto at 166. This stop has a depending weighted portion 167, that extends to one side of the pivotal center of the stop and tends to normally maintain the stop against the relatively fixed pin 168, carried by the bracket 164. Pivoted to what may be termed a "top" plate 169 of the machine is a rack or stop bar 170. This bar is recessed or apertured at its ends, as indicated at 171, for the reception of pins 172, and the construction is such that a slight longitudinal movement may be imparted to the bar as well as a turning movement on its pivot-pins. Adjustably secured to the rack-bar or stop-rod 170 is a combined trip or stop 173, which has a cam-like trip portion 174 projecting therefrom in advance or to right of the stop 175. The part 173 is adapted to be adjusted to any suitable point on the stop-bar, which is provided with a scale on its upper face that corresponds to the carriage-scale in order to facilitate such adjustment. Depending from the stop-bar is a pin 176, which is received in an opening in the upper bent end of a lever 177, that is pivoted to a fixed portion of the machine, as indicated at 178, and is connected at its lower end by a pin-and-slot connection 179 to a bar 180, that extends transversely across the machine and is supported near its ends within slots formed in the depending bracket-arms 181, secured by screws 182 to lugs 1$^a$, that project inwardly from the frame of the machine. The bar 180 is provided with depressions or slots 184 near the ends thereof, and when the bar is in the normal position these slots are beneath the rearwardly-extending arms 28 of the universal bar 27 and permit the depression thereof. When, however, the bar 180 is moved toward the right in Fig. 4, the slots 184 are moved out of register with the arms 28 and the full or higher portions of the bar are brought beneath the arms, thus preventing a depression thereof. This longitudinal movement of the locking-bar to effect the locking of the universal bar is effected when the carriage brings the stop 165 into contact with the stop 175 and moves the stop-bar 170 from right to left and against the tension of a spring 177$^\times$, that restores the parts to their normal positions, with the stop-bar 170 at the limit of its movement toward the right. This movement of the stop-bar from right to left results in a corresponding movement of the upper end of the lever 177, with the movement of the lower end of said lever in an opposite direction, thereby effecting a locking movement of the bar 180. When the locking-bar 180 is in the locking position, a depression of the universal bar will be prevented, and it follows that at this time a depression of the finger-keys will likewise be prevented. When the carriage is moved away from the stop 175 and toward the right, the spring 177$^\times$, which coöperates with the lever 177, will move it, together with the parts connected therewith, to the normal position, and the locking-bar will be automatically moved to a position where the universal bar is free to be depressed. A margin-stop release key-lever 185 is pivoted in the machine in a similar manner to the key-levers of the type-actions and is provided with a finger-key that extends to the keyboard of the machine. This key-lever is pivoted to an upwardly-extending link 186, as indicated at 187, the upper end of the link being pivoted at 188 to an arm 189, that is riveted at 190 to a pin or crank-arm at 191, that projects downwardly and forwardly from the lower side of the stop-bar 170. Should the operator desire to write one or more characters after the line-lock mechanism has been locked in order to complete a word or sentence or to insert a hyphen, it is merely necessary to depress the key-lever 185, thus rocking the bar 170 on its pivotal center, and this movement is effective to move the stop 175 out of the path of and contact with the stop 165. The spring 177$^\times$ will then move the bar 170 from left to right and a releasing movement of the universal bar will be effected. It will be understood that the trip 174 on the part 173 is employed to turn the bar 170 and effect a sounding of an alarm by the usual means (not shown) before the line-lock mechanism is actuated to prevent a depression of the finger-keys.

What I claim as new, and desire to secure by Letters Patent, is—

1. In a type-writing machine, the combination of a type-writer carriage and an auxiliary carriage which is independent of but is normally and positively connected to travel with said type-writer carriage and in the same direction as said type-writer carriage.

2. In a type-writing machine, the combination of a type-writer carriage, an auxiliary carriage which moves in unison with said type-writer carriage and has a movement independent of said type-writer carriage in the direction of the travel thereof.

3. In a type-writing machine, the combination of a type-writer carriage, a part which moves in unison with said type-writer carriage and has a movement independent of said type-writer carriage in the direction parallel thereto, and line-spacing mechanism operated by the independent movement of said part.

4. In a type-writing machine, the combination of a type-writer carriage, an auxiliary carriage which is independent of but moves in unison and parallel with said type-writer carriage and has a movement independent of said type-writer carriage in the direction of the travel thereof, intermediate gear connections between said type-writer and auxiliary carriages, and line-spacing mechanism operated by the independent movement of the auxiliary carriage.

5. In a type-writing machine and tabulating mechanism, the combination of a type-writer carriage, a tabulating-stop, a series of denominational stops, depressible denominational key-levers having a general substantially horizontal disposition and located between the carriage and the keyboard of the machine, and effective to interpose one of said denominational and tabulating stops in the path of the other, and means for releasing the carriage on an actuation of any of said denominational key-levers.

6. In a type-writing machine and tabulating mechanism, the combination of a type-writer carriage, a coöperating auxiliary carriage on the front of the machine, a scale and pointer, one of which is carried by the frame of the machine and the other by the said auxiliary carriage, a tabulating-stop on the auxiliary carriage, a coöperating stop on the frame of the machine, and key-actuated means for interposing one of said stops in the path of the other.

7. In a type-writing machine and tabulating mechanism, the combination of a type-writer carriage, a coöperating auxiliary carriage at the front of the machine, a pointer carried by the frame of the machine, a coöperating scale on the auxiliary carriage, a tabulating-stop on the auxiliary carriage, means for affording an adjustment of said stop relatively to said scale, a coöperating stop on the frame of the machine, and key-actuated means for interposing one of said stops in the path of the other.

8. In a type-writing machine and tabulating mechanism, the combination of a carriage, a part independent of but which is normally and positively connected to travel with said carriage, a tabulating-stop carried by said part, and a stop on the frame of the machine with which said first-mentioned stop is brought into contact to arrest the carriage.

9. In a type-writing machine and tabulating mechanism, the combination of a carriage, a part independent of but which is normally and positively connected to travel with the carriage, a tabulating-stop, and a coöperating series of denominational stops, the tabulating and denominational stops being carried one by the frame of the machine and the other by said traveling part.

10. In a type-writing machine and tabulating mechanism, the combination of a type-writer carriage, an auxiliary carriage independent of but which is positively connected to travel with said type-writer carriage during the travel thereof in both directions, a tabulating-stop carried by said auxiliary carriage, a series of stops, cooperating denominational stops upon the frame of the machine, and means for interposing one of said denominational and tabulating stops in the path of the other to arrest the type-writer carriage.

11. In a type-writing machine and tabulating mechanism, the combination of a type-writer carriage, a part which is independent of but which moves in unison with said carriage, a tabulating-stop carried by said part, a coöperating tabulating-stop carried by the frame of the machine, and a finger-piece connected to said part, and by which the type-writer carriage may be moved in the direction of its travel.

12. In a type-writing machine, the combination of a type-writer carriage, an auxiliary carriage independent of but which moves in unison with said type-writer carriage during the travel thereof in both directions, hand-operated means connected to the auxiliary carriage and by means of which the type-writer carriage can be moved, and a type-writer-carriage-release key carried by said auxiliary carriage and which is effective to release the type-writer carriage.

13. In a type-writing machine and tabulating mechanism, the combination of a type-writer carriage, an auxiliary carriage independent of but which moves in unison with said type-writer carriage during the travel thereof in both directions, a tabulating-stop carried by said auxiliary carriage, a coöperating tabulating-stop carried by the frame of the machine, hand-operated means connected to the auxiliary carriage and by means of which the type-writer carriage can be moved, and a type-writer-carriage-release key carried by said auxiliary carriage and which is effective to release the type-writer carriage.

14. In a type-writing machine and tabulating mechanism, the combination of a type-writer carriage, an auxiliary carriage independent of but which is positively connected to the type-writer carriage and is located at the front of the machine, a tabulating-stop, and a plurality of denominational stops, one of which denominational and tabulating stops is carried by the frame of the machine and the other on said auxiliary carriage, means for moving the denominational and tabulating stops one in the path of the other, and means for releasing the type-writer carriage when the said moving means are actuated.

15. In a type-writing machine and tabulating mechanism, the combination of a type-writer carriage, an auxiliary carriage independent of the type-writer carriage, intermediate positive gear connections between said type-writer and auxiliary carriages to cause the two carriages to travel together, a tabulating-stop, and a plurality of denominational stops, one of which denominational and tabulating stops is carried by the frame of the machine and the other on said auxiliary carriage, means for moving the denominational and tabulating stops one in the path of the other, and means for releasing the type-writer carriage when the said moving means are actuated.

16. In a type-writing machine and tabulating mechanism, the combination of a type-writer carriage, an auxiliary carriage independent of but moving in unison with the type-writer carriage, and located at the front of the machine, a finger-piece carried by said auxiliary carriage and by means of which the type-writer carriage may be moved, a tabulating-stop, and a plurality of denominational stops, one of which denominational and tabulating stops is carried by the frame of the machine and the other on said auxiliary carriage, means for moving the denominational and tabulating stops one in the path of the other, and means for releasing the type-writer carriage, when the said moving means are actuated.

17. In a type-writing machine and tabulating mechanism, the combination of a type-writer carriage, an auxiliary carriage independent of the type-writer carriage and located at the front of the machine, intermediate gear connections between said type-writer and auxiliary carriages so that they will move in unison, a release-key carried by said auxiliary carriage and by means of which the type-writer carriage may be released, a tabulating-stop, and a plurality of denominational stops, one of which denominational and tabulating stops is carried by the frame of the machine and the other on said auxiliary carriage, means for moving the denominational and tabulating stops one in the path of the other, and means for releasing the type-writer carriage when the said moving means are actuated.

18. In a type-writing machine and tabulating mechanism, the combination of a type-writer carriage, key-operated printing instrumentalities, a tabulating-carriage which is independent of but travels with the type-writer carriage, a tabulating-stop, denominational stops, and a series of denominational keys located between the keyboard and the printing instrumentalities and effective to interpose the denominational and tabulating stops one in the path of the other.

19. In a type-writing machine and tabulating mechanism, the combination of a type-writer carriage, an independent tabulating-carriage which travels therewith, a tabulating-stop upon said tabulating-carriage, denominational stops, a series of denominational keys located between the keyboard and the carriage and effective to interpose one of the denominational stops in the path of the tabulating-stop, and means for releasing the type-writer carriage on the actuation of any of said denominational keys.

20. In a type-writing machine and tabulating mechanism therefor, the combination of key-operated printing instrumentalities, a type-writer carriage, an independent tabulating-carriage which travels therewith, a tabulating-stop carried by said tabulating-carriage, denominational stops on the frame of the machine, and a series of denominational keys located between the keyboard and the printing instrumentalities and effective to interpose the denominational stops in the path of the tabulating-stop.

21. In a type-writing machine and tabulating mechanism, the combination of a power-driven type-writer carriage, escapement mechanism therefor, key-operated printing instrumentalities, an independent tabulating-carriage which travels therewith, a tabulating-stop carried by said tabulating-carriage, denominational stops, a series of depressible denominational key-levers located between the keyboard and the printing instrumentalities effective to interpose the denominational stops in the path of the tabulating-stop, and means for releasing the type-writer carriage from its escapement mechanism on the depression of any of said denominational key-levers.

22. In a type-writing machine, the combination of a type-writer carriage, an auxiliary carriage which is independent of but moves with said type-writer carriage, and a finger-piece on said auxiliary carriage, whereby the type-writer carriage may be restored to the initial position by said auxiliary carriage.

23. In a type-writing machine, the combination of key-operated printing instrumentalities, a type-writer carriage, an auxiliary carriage which is independent of but moves with said type-writer carriage and is located intermediate of the keyboard and printing instrumentalities, and a finger-piece on said auxiliary carriage, whereby the type-writer carriage may be restored to the initial position by said auxiliary carriage.

24. In a type-writing machine, the combination of a type-writer carriage, escapement mechanism therefor, an auxiliary carriage which is independent of but moves with said type-writer carriage, and a finger-piece on said auxiliary carriage for moving it and the type-writer carriage, and a release-key carried by the auxiliary carriage which is effective to release the type-writer carriage from its escapement mechanism.

25. In a type-writing machine, the combination of key-operated printing instrumentalities, a power-driven type-writer carriage, escapement mechanism therefor, an auxiliary carriage which is independent of but is geared to said type-writer carriage and is located intermediate of the keyboard and printing instrumentalities, a finger-piece on said auxiliary carriage for moving it and the type-writer carriage, and a release-key carried by the auxiliary carriage and which is effective to release the type-writer carriage from its escapement mechanism.

26. In a type-writing machine, the combination of a type-writer carriage, a platen, line-spacing mechanism therefor, an auxiliary carriage which is independent of but moves with said type-writer carriage, a finger-piece for moving the auxiliary carriage to restore the type-writer carriage to the initial position, and means for automatically actuating the line-spacing mechanism when the type-writer carriage is restored to the initial position by means of said auxiliary carriage.

27. In a type-writing machine, the combination of a type-writer carriage, a platen, line-spacing mechanism therefor, an auxiliary carriage which is independent of but moves with said type-writer carriage, a finger-piece for moving the auxiliary carriage to restore the type-writer carriage to the initial position, and spring-restored means which may or may not automatically actuate the line-spacing mechanism when the type-writer carriage is moved to the right by means of said auxiliary carriage, whereby the line-spacing mechanism may or may not be actuated when the type-writer carriage is moved to the right by the auxiliary carriage as the operator may elect.

28. In a type-writing machine, the combination of a power-driven type-writer carriage, escapement mechanism therefor, a platen, line-spacing mechanism therefor, an auxiliary carriage which is independent of but moves with said type-writer carriage, a finger-piece for moving the auxiliary carriage to restore the type-writer carriage to the initial position, means for automatically actuating the line-spacing mechanism when the type-writer carriage is restored to the initial position by means of said auxiliary carriage, and a hand-operated release-key carried by said auxiliary carriage effective to release the carriage from its escapement mechanism.

29. In a type-writing machine, the combination of a power-driven type-writer carriage, escapement mechanism therefor, a platen, line-spacing mechanism therefor, an auxiliary carriage which is independent of but is geared to move with said type-writer carriage and is located at the front of the machine, a finger-piece for moving the auxiliary carriage to restore the type-writer carriage to the initial position, spring-restored means which may automatically actuate the line-spacing mechanism when the type-writer carriage is moved to the right by means of said auxiliary carriage, and a hand-operated release-key carried by said auxiliary carriage operatively connected to release the carriage from its escapement mechanism.

30. In a type-writing machine, the combination of key-actuated printing instrumentalities, a power-driven type-writer carriage, escapement mechanism therefor, a platen, line spacing mechanism therefor, an auxiliary carriage which is independent of but geared to move with said type-writer carriage and is located intermediate the keyboard and the printing instrumentalities, a finger-piece for moving the auxiliary carriage to restore the type-writer carriage to the initial position, spring-restored means which may automatically actuate the line-spacing mechanism when the type-writer carriage is moved to the right by means of said auxiliary carriage, a hand-operated release-key carried by said auxiliary carriage and operatively connected to release the carriage from its escapement mechanism, and a scale and a pointer, one of said parts being carried by the auxiliary carriage and the other by the frame of the machine.

31. In a type-writing machine, the combination of a type-writer carriage, an auxiliary carriage which moves in unison with said type-writer carriage, a scale and a coöperating pointer, one of said parts being carried by the auxiliary carriage and the other by the frame of the machine.

32. In a type-writing machine, the combination of a power-driven type-writer carriage, an auxiliary carriage geared to move in unison with said type-writer carriage and located at the front of the machine, and a scale and a coöperating pointer, one of said parts being carried by the auxiliary carriage and the other by the frame of the machine.

33. In a type-writing machine, the combination of key-actuated printing instrumentalities, a power-driven type-writer carriage, an auxiliary carriage which is independent of the type-writer carriage and is located at the front of the machine and intermediate of the keyboard and printing instrumentalities, intermediate gear connections between said carriages which causes them to move together and to corresponding distances in both directions, a scale, and a coöperating pointer, one of which is carried by said auxiliary carriage and the other by the frame of the machine.

34. In a type-writing machine and tabulating mechanism, the combination of a type-writer carriage, a coöperating auxiliary carriage at the front of the machine, a scale and pointer, one of which is carried by the frame of the machine and the other by the auxiliary carriage, a tabulating-stop on the auxiliary carriage and a series of denominational key-levers mounted on the frame of the machine and adapted to be interposed in the path of the tabulating-stop, to arrest the auxiliary carriage and thereby arrest the type-writer carriage at different denominational positions in accordance with the denominational key which is actuated.

35. In a type-writing machine and tabulating mechanism, the combination of a power-driven type-writer carriage, escapement mechanism therefor, a coöperating auxiliary carriage at the front of the machine which is independent of but moves with said type-writer carriage, a scale which is carried by the auxiliary carriage, a tabulating-stop on the auxiliary carriage, a series of denominational key-levers mounted on the frame of the machine and adapted to be interposed in the path of the tabulating-stop, to arrest the auxiliary carriage and thereby arrest the type-writer carriage at different denominational positions in accordance with the denominational key which is actuated, and means controlled by said denominational key-levers for releasing the type-writer carriage from its escapement mechanism.

36. In a type-writing machine and tabulating mechanism, the combination of a power-driven type-writer carriage, escapement mechanism therefor, an auxiliary carriage at the front of the machine and connected by gear connections to said type-writer carriage, a scale and pointer, one of which is carried by the frame of the machine and the other by the auxiliary carriage, a tabulating-stop on the auxiliary carriage, a series of denominational key-levers pivoted to the frame of the machine and adapted to be interposed in the path of the tabulating-stop, to arrest the auxiliary carriage and thereby arrest the type-writer carriage at different denominational positions in accordance with the donominational key which is actuated, and means controlled by said denominational key-levers for releasing the type-writer carriage from its escapement mechanism.

37. In a type-writing machine, the combination of a type-writer carriage, a platen, line-spacing mechanism therefor, tabulating mechanism, and means for automatically actuating the line-spacing mechanism through said tabulating mechanism.

38. In a type-writing machine, the combination of a type-writer carriage, a platen, line-spacing mechanism therefor, tabulating mechanism and means which may automatically actuate the line-spacing mechanism through a portion of said tabulating mechanism.

39. In a type-writing machine, the combination of a type-writer carriage, coöperating tabulating mechanism, and means for moving said carriage by hand through a portion of the tabulating mechanism.

40. In a type-writing machine, the combination of a power-driven type-writer carriage, escapement mechanism therefor, coöperating tabulating mechanism for releasing the carriage and arresting it at a predetermined point, and means for affording a movement of said carriage to the right, by a portion of the tabulating mechanism.

41. In a type-writing machine, the combination of a power-driven type-writer carriage, escapement mechanism therefor, coöperating tabulating mechanism, carriage-releasing means controlled by said tabulating mechanism, and independently-operable means for releasing the carriage from its escapement mechanism through said tabulating mechanism.

42. In a type-writing machine, the combination of a type-writer carriage, coöperating tabulating mechanism independent of but traveling with said type-writer carriage, and a scale and pointer at the front of the machine for indicating the position of the carriage, one of said scale and pointer elements being carried by the tabulating mechanism and the other by the frame of the machine.

43. In a type-writing machine, the combination of a carriage, coöperating tabulating mechanism, a scale carried by said tabulating mechanism and extending in the direction of the travel of the carriage and moving therewith and constituting indicating means for determining the proper positioning of the tabulating stop or stops, and a pointer coöperating with said scale to determine the position of the carriage with relation to the printing-center.

44. In a type-writing machine, the combination of a carriage, coöperating tabulating mechanism, a scale carried by said tabulating mechanism and extending in the direction of the travel of the carriage and moving in unison therewith and constituting indicating means for determining the proper positioning of the tabulating stop or stops, and a pointer carried by and fixed to the frame of the machine and coöperating with said scale to determine the position of the carriage with relation to the printing-center.

45. In a tabulating device, the combination of a series of U-shaped denominational key-levers, a tabulating-stop, and means for moving the key-levers into the path of the tabulating-stop.

46. In a tabulating device, the combination of a series of U-shaped denominational key-levers contained within one another, a tabulating-stop, and means for moving the key-levers and stop one into the path of the other.

47. In a type-writing machine and tabulating mechanism, the combination of a carriage, a series of U-shaped denominational key-levers contained within one another and pivoted to the frame of the machine, a tabulating-stop which moves with the carriage, and means for moving the key-levers and stop, one into the path of the other.

48. In a type-writing machine and tabulating mechanism, the combination of key-actuated printing instrumentalities, a carriage, a tabulating-stop which moves with the carriage, a series of coöperating spring-restored denominational key-levers pivoted to the frame of the machine at the front portion thereof and intermediate the keyboard and printing instrumentalities and contained within one another and finger-pieces on said key-levers for actuating them.

49. In a type-writing machine and tabulating mechanism, the combination of a power-driven carriage, escapement mechanism therefor, a tabulating-stop which travels with the carriage, a series of denominational U-shaped key-levers which coöperate with the tabulating-stop to arrest the carriage at different denominational positions, means for adjusting the tabulating and denominational stops with relation to one another, and means controlled by said key-levers for releasing the carriage from its escapement mechanism.

50. In a type-writing machine and tabulating mechanism, the combination of a power-driven carriage, escapement mechanism therefor, a tabulating-stop independent of the carriage but which travels in unison therewith, a series of spring-restored denominational key-levers near the front of the machine and coöperating with the tabulating-stop to arrest the carriage at different denominational positions, means for adjusting the tabulating and denominational stops with relation to one another, and a universal bar that is actuated by said levers and is effective to release the carriage from its escapement mechanism when a denominational key-lever is depressed.

51. In a type-writing machine and tabulating mechanism, the combination of a power-driven carriage, escapement mechanism therefor, a tabulating-stop which travels with the carriage, a series of spring-restored denominational U-shaped key-levers projecting to the front of the machine and coöperating with the tabulating-stop to arrest the carriage at different denominational positions, means for adjusting the tabulating and denominational stops with relation to one another, projections extending from said key-levers, and a universal bar that is actuated by said projections and is effective to release the carriage from its escapement mechanism when a denominational key-lever is depressed.

52. In a type-writing machine and tabulating mechanism, the combination of a type-writer carriage, an auxiliary carriage that is independent of but is positively connected to travel with said type-writer carriage, a column-stop that is adjustable on said auxiliary carriage to regulate the position of the column, a series of denominational stops, and means for moving the denominational and tabulating stop one into the path of the other.

53. In a type-writing machine and tabulating mechanism, the combination of a power-driven type-writer carriage, escapement mechanism therefor, an auxiliary carriage that is independent of but is positively connected to travel with said type-writer carriage, a column-stop that is adjustable on said auxiliary carriage to regulate the position of the column, a series of denominational stops, means for moving the denominational and tabulating stops one into the path of the other, and means for releasing the carriage from its escapement mechanism when the stops are in each other's path.

54. In a type-writing machine and tabulating mechanism, the combination of a type-writer carriage, an auxiliary carriage that is independent of but moves with said type-writer carriage and is located at the front of the machine, a column-stop that is adjustable on said auxiliary carriage to regulate the position of the column, a series of denominational key-levers that extend to the front of the machine, and means for moving the denominational key-levers into the path of the column-stop.

55. In a type-writing machine and tabulating mechanism, the combination of a power-driven type-writer carriage, escapement mechanism therefor, an auxiliary carriage that is independent of but moves with said type-writer carriage and is located at the front of the machine, a column-stop that is adjustable on said auxiliary carriage to regulate the position of the column, a series of denominational key-levers, and means for moving the denominational key-levers into the path of the column-stop, and means for releasing the carriage from its escapement mechanism when a denominational key-lever is actuated.

56. In a type-writing machine and tabulating mechanism, the combination of a power-driven type-writer carriage, escapement mechanism therefor, an auxiliary carriage that is independent of but moves with said type-writer carriage, and is located at the front of the machine, a column-stop that is adjustable on said auxiliary carriage to regulate the position of the column, a series of U-shaped spring-restored denominational key-levers that extend to the front of the machine and are nested or contained within one another, and means for moving the denominational key-levers into the path of the column-stop and means for releasing the carriage from its escapement mechanism when a denominational key-lever is actuated.

57. In a type-writing machine and tabulating mechanism, the combination of a type-writer carriage, escapement mechanism therefor, a tabulating-stop, a moving device therefor, means for automatically locking the stop-moving device to the carriage when the carriage is freed from its escapement mechanism, and a second tabulating-stop coöperating with said first-mentioned stop.

58. In a type-writing machine and tabulating mechanism, the combination of a type-writer carriage, escapement mechanism therefor, a tabulating-stop, moving means therefor which are controlled by the carriage, means for automatically locking the stop-moving means to the carriage when the carriage is freed from its escapement mechanism, a second tabulating-stop, and key-actuated means for moving one of said stops into the path of the other and for releasing the carriage from its escapement mechanism.

59. In a type-writing machine and tabulating mechanism, the combination of a type-writer carriage, escapement mechanism therefor, a tabulating-stop which is independent of the carriage, a rack for moving the stop in unison with the carriage, means for automatically locking the stop-moving rack to the carriage when the carriage is freed from its escapement mechanism, a second tabulating-stop coöperating with said first-mentioned stop, and key-actuated means for moving one of said stops into the path of the other.

60. In a type-writing machine and tabulating mechanism, the combination of a power-driven type-writer carriage, escapement mechanism therefor, a tabulating-stop which is independent of the carriage, a rack for moving the stop in unison with the carriage, means for automatically locking the stop-moving rack to the carriage when the carriage is freed from its escapement mechanism, a series of denominational stops, means for interposing any of said denominational stops in the path of the tabulating-stop, and means for automatically releasing the carriage from its escapement mechanism on the actuation of any of said denominational stops.

61. In a type-writing machine and tabulating mechanism, the combination of a type-writer carriage, line-spacing mechanism, a tabulating-stop operatively connected to the line-spacing mechanism, means adapted to effect a movement of the line-spacing mechanism by a movement of said stop, and a second coöperating tabulating-stop.

62. In a type-writing machine and tabulating mechanism, the combination of a type-writer carriage, line-spacing mechanism, a tabulating-stop operatively connected to the line-spacing mechanism, means adapted to effect a movement of the line-spacing mechanism and a restoration of the carriage by a movement of the stop, and a second coöperating stop.

63. In a type-writing machine and tabulating mechanism, the combination of a type-writer carriage, escapement mechanism therefor, line-spacing mechanism, a tabulating-stop operatively connected to the line-spacing mechanism, means for effecting a movement of the line-spacing mechanism by a movement of the stop, a second coöperating tabulating-stop, means for releasing the carriage from its escapement mechanism, and means for automatically locking the first-mentioned stop in a fixed relation in its operative connection with the carriage.

64. In a type-writing machine and tabulating mechanism, the combination of a power-driven carriage, a type-writer carriage, escapement mechanism therefor, line-spacing mechanism, a tabulating-stop operatively connected to the line-spacing mechanism, hand-operated means connected to the tabulating mechanism for effecting a movement of the line-spacing mechanism and a restoration of the carriage, a second coöperating tabulating-stop, means for releasing the carriage from its escapement mechanism, and means for automatically locking the first-mentioned stop in a fixed relation in its operative connection with the carriage.

65. In a type-writing machine and tabulating mechanism, the combination of a type-writer carriage, line-spacing mechanism therefor, an auxiliary carriage, a tabulating-stop carried by said auxiliary carriage, a finger-piece for moving said auxiliary carriage, means controlled by said auxiliary carriage for actuating the line-spacing mechanism, and a second coöperating tabulating-stop.

66. In a type-writing machine and tabulating mechanism, the combination of a type-writer carriage, line-spacing mechanism therefor, an auxiliary carriage, a tabulating-stop carried by said auxiliary carriage, a finger-piece for moving said auxiliary carriage, means controlled by said auxiliary carriage for actuating the line-spacing mechanism, and for restoring the type-writer carriage to the initial position, and a second coöperating tabulating-stop.

67. In a type-writing machine and tabulating mechanism, the combination of a type-writer carriage, line-spacing mechanism therefor, an auxiliary carriage, a tabulating-stop carried by said auxiliary carriage, a finger-piece for moving said auxiliary carriage, means controlled by said auxiliary carriage for actuating the line-spacing mechanism, a series of denominational stops, and means for interposing any of said denominational stops in the path of the tabulating-stop.

68. In a type-writing machine and tabulating mechanism, the combination of a power-driven type-writer carriage, escapement mechanism therefor, a platen, line-spacing mechanism for the platen, an auxiliary carriage, a tabulating-stop carried by said auxiliary carriage, a finger-piece for moving said auxiliary carriage, means controlled by said auxiliary carriage for actuating the line-spacing mechanism and for restoring the type-writer carriage to the initial position, a series of denominational stops, means for interposing any of said denominational stops in the path of the tabulating-stop, and means for releasing the type-writer carriage from its escapement mechanism when a denominational stop is in the path of the tabulating-stop.

69. In a type-writing machine and tabulating mechanism, the combination of a power-driven type-writer carriage, escapement mechanism therefor, line-spacing mechanism for the platen, an auxiliary carriage, a tabulating-stop carried by said auxiliary carriage, a finger-piece for moving said auxiliary carriage, means controlled by said auxiliary carriage for actuating the line-spacing mechanism, a second coöperating tabulating-stop, means for releasing the type-writer carriage from its escapement mechanism, and means for automatically locking the auxiliary carriage in a fixed relation to the type-writer carriage when the type-writer carriage is freed from its escapement mechanism.

70. In a type-writing machine and tabulating mechanism, the combination of a type-writer carriage, a coöperative auxiliary carriage, a tabulating-stop, a series of denominational stops, one of said stops being carried by the auxiliary carriage, denominational key-levers located between the carriage and keyboard of the machine and effective to interpose one of said denominational and tabulating stops in the path of the other, and means for releasing the carriage on an actuation of any of said denominational key-levers.

71. In a type-writing machine and tabulating mechanism, the combination of a type-writer carriage, a coöperating auxiliary carriage independent of but positively connected to travel with the type-writer carriage, a pointer carried by the frame of the machine, a coöperating scale on the auxiliary carriage, a tabulating-stop on the auxiliary carriage, and means for affording an adjustment of said stop relatively to said scale, a coöperating stop on the frame of the machine, and key-actuated means for interposing one of said stops in the path of the other.

72. In a type-writing machine, the combination of a type-writer carriage, line-spacing mechanism, a part connected to said carriage but independent thereof and moving in unison therewith in the same direction and parallel to the movement of the carriage and having a movement independent of said carriage, and means whereby a line spacing is effected by the independent movement of said part.

73. In a type-writing machine, the combination of a power-driven type-writer carriage, escapement mechanism therefor, coöperating tabulating mechanism including an auxiliary carriage independent of the type-writer carriage but moving in unison therewith, and means operable independently of the stop-actuating means of the tabulating mechanism for releasing the carriage from its escapement mechanism through said tabulating mechanism.

74. In a type-writing machine, the combination of a carriage, coöperating tabulating mechanism including an auxiliary carriage which is independent of but moves in unison with the type-writer carriage, a scale carried by said auxiliary carriage and constituting indicating means for determining the proper positioning of the tabulating stop or stops, and a pointer coöperating with said scale to determine the position of the carriage with relation to the printing-center.

75. In a type-writing machine, the combination of a type-writer carriage, coöperating tabulating mechanism including an auxiliary carriage which is independent of but travels in unison with the type-writer carriage, a scale carried by said auxiliary carriage and extending in the direction of the travel of said auxiliary carriage and moving therewith and constituting indicating means for determining the proper positioning of the tabulating stop or stops, and a pointer carried by and fixed to the frame of the machine and coöperating with said scale to determine the position of the carriage with relation to the printing-center.

76. In a type-writing machine and tabulating mechanism, the combination of a power-driven carriage, escapement mechanism therefor, a tabulating-stop which is independent of the carriage but travels in unison therewith, a series of denominational U-shaped key-levers which coöperate with the tabulating-stop to arrest the carriage at different denominational positions, means for adjusting the tabulating and denominational stops with relation to one another, and means controlled by said key-levers for releasing the carriage from its escapement mechanism.

Signed in the borough of Manhattan, city of New York, the county of New York and State of New York, this 19th day of May, A. D. 1902.

BYRON A. BROOKS.

Witnesses:
K. V. DONOVAN,
E. M. WELLS.